Aug. 21, 1934.                V. C. ERNST ET AL                1,970,958
                              OPTICAL APPLIANCE
                              Filed Oct. 15, 1930
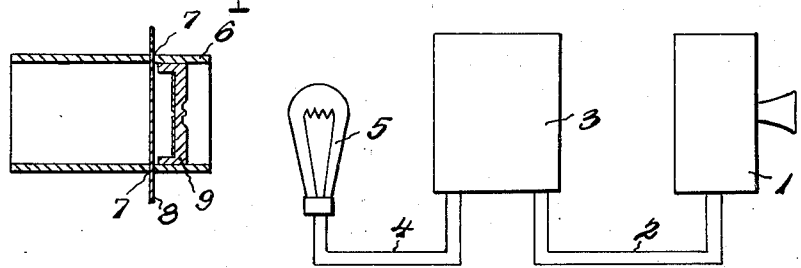
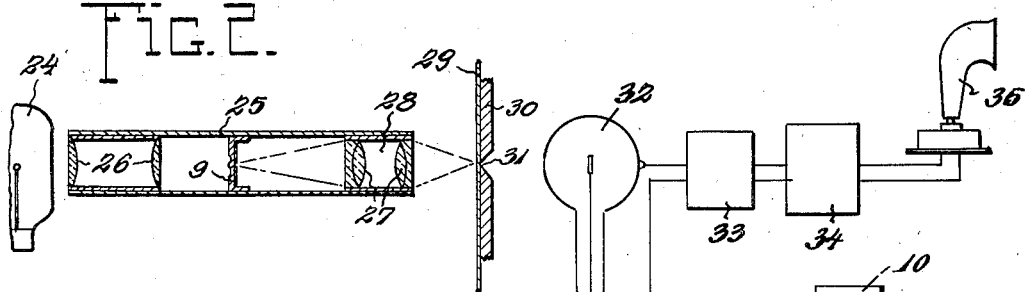
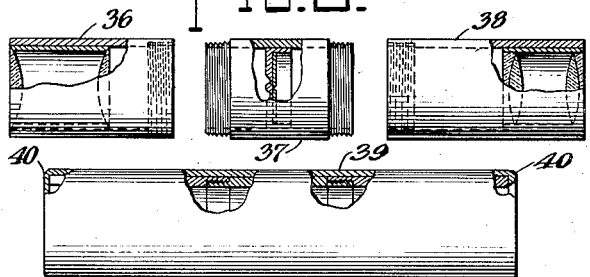
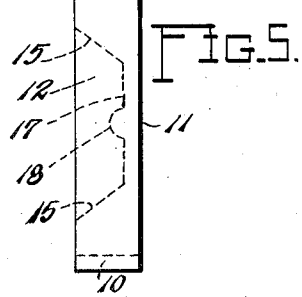
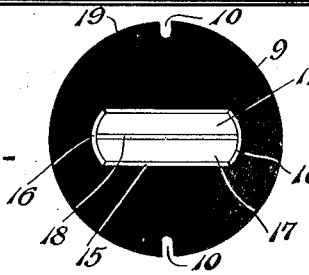
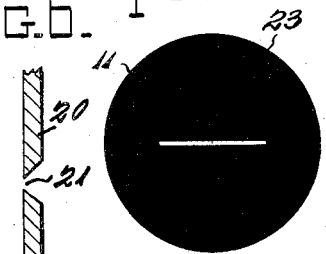
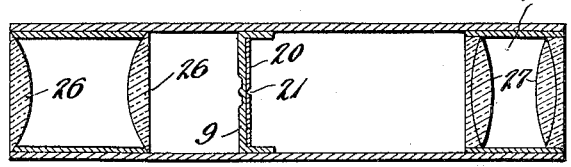
Inventors
VICTOR C. ERNST.
ANDREW WOLLENSAK.
Attorney Patented Aug. 21, 1934

1,970,958

UNITED STATES PATENT OFFICE 1,970,958

OPTICAL APPLIANCE

Victor C. Ernst and Andrew Wollensak, Rochester, N. Y.

Application October 15, 1930, Serial No. 488,850

6 Claims. (Cl. 179—100.31)

Our invention pertains to an optical appliance. More particularly our invention relates to a perfected design of lens of extremely small dimensions for use in the art of production of and reproduction from sound track records in the "sound on film" industry.

The disclosure of this application constitutes the latest development of an elongated extremely narrow lenticular element adapted linearly to refract as first shown and described in the pending application of Victor C. Ernst filed December 23, 1926, Serial Number 156,738; the further use of which was next taught in co-pending joint application of V. C. Ernst and J. C. Wollensak, filed March 3d, 1930, Serial No. 432,772 and the generic claim for which is being made in a divisional application of V. C. Ernst filed of even date herewith.

The disclosure of this application is to be considered as a continuation in part of copending application filed March 3, 1930, Serial No. 432,772.

The preferred form of our invention is an elongated cylindrically surfaced plano-convex lens as first successfully employed in commercial use, only five-sixteenths ($\frac{5}{16}$") of an inch long and sixteen thousandths (.016") of an inch wide, which is to say, with the chord of the cylindrical surface sixteen thousandths (.016") of an inch in length and an established focal length of about 5 mil. In order properly to mount so small an optical element our evolved design embraces a series of structural features, as herein shown, described and claimed.

The object of our invention is to accelerate and to intensify the recordation of light rays and thereby greatly to improve the sharpness of definition of the visual trace of a sound record and to obtain a closer approach both of recordation and of reproduction of every tonal modulation.

It is to be realized that the scope of our invention comprehends many equivalent methods and constructions. The showing of the drawing and the particular description are merely specific exemplifications.

Adverting to the drawing:

Figure 1 is a diagrammatic view, partly in section, of apparatus employing our invention for the production of a sound record.

Figure 2 is in part a conventionalized diagrammatic illustration, partly in section, of an apparatus embodying our invention for reproducing a sound record upon a transparent film.

Figure 3 is a longitudinal sectional view of a projecting tube or composite objective including our invention, enlarged to about double actual size.

Figure 4 is a greater enlargement of a plan view of the lenticular element embodying our invention.

Figure 5 is an end view of Figure 4 still further enlarged.

Figure 6 is a diametrical section of a diaphragm provided with a diametrical slit.

Figure 7 is a view corresponding to Figure 4 with an opaque, masking envelopment in substitution for the separate diaphragm.

Fig. 8 is a broken sectional view of our composite tubular optical unit.

In Figure 1 is shown a microphone 1 provided with a connection 2 leading to an amplifier 3 which is in turn connected at 4 to the sound sensitive lamp 5. The lamp 5 is suitably positioned with reference to the axis of a tube 6 which is fashioned with diametrically opposite slots 7 through which one longitudinal margin of a motion picture film 8 is to be moved. Fitted within the tube 6 in front of the film 8 with reference to the location of the lamp 5 is a lenticular element 9 diametrically opposite portions of the periphery of which are notched at 10 (see Figure 4) for the purpose of securing the lenticular element in proper position within the tube, as for instance, in cooperation with set screws, which are not shown because so common an expedient and because not specifically claimed.

The lenticular element exemplifiedly illustrated is a round disc which is flat on one side 11 and has its other side fashioned with an oblong cavity 12. The cavity is of quadrilateral shape and is defined by two downwardly converging longitudinally extending walls 15 and by two end walls 16. The converging walls 15 do not meet, but terminate in a common bottom plane of the cavity, which plane is nearer the flat side 11. Bordering each of the lines of intersection of the walls 15, the bottom 17 of the cavity is flat. Actually, the oblong bottom is bisected into two halves owing to the formation of a minute cylindrically surfaced lens 18 which extends longitudinally across the middle of the bottom 17 so that the axis of the cylindrical lens lies in a diametrical plane of the round element 9. Surrounding the borders of the cavity 14, the side of the round disc 9 which is opposite to the side 11 is made opaque as indicated by the numeral 19. Such opaque area may be accomplished by etching or by any other appropriate means. Because such optical or lenticular elements are usually made of glass and because a glass disc, even considerably thicker than the distance of the cylindric lens 18 from the side 11 would be extremely friable, it was discovered to be expedient to provide greater strength with consideration of the fact that the actual chordal dimension of the lens 18 is only sixteen thousandths (.016") of an inch. Wherefore the lens may be said to be of microscopic focal length. As mounted in Figure 1 it refracts to a linear focus along one margin of the film 8 to produce a line of light of about one mil in width or less if the arc of curvature be less.

Manifestly, if the thickness of the lenticular disc (distance between side 11 and bottom 17) was only of substantially the same dimension (.016 of an inch) it would scarcely be feasible properly to grind the lens surface and its mounting would be an extremely delicate manipulation and the likelihood of fracture very great. We have therefore thickened the disc throughout the area which envelops the oblong cavity 14 to from three to four times, as is clearly shown in Figure 5. The design of our lenticular disc is such that the lens 18 is adapted linearly to refract to a focus in the plane of the side 11. The lens 18 need not have one specific radius of curvature, but we believe an approximately true cylindrical surface to be best. We have obtained a focus line of one thousandth (.001") of an inch. In order to eliminate aberration, an opaque diaphragm 20, provided with a slit 21 and appositioned at the focal plane 11, may be used. The slit 21 should be at least as long as the lens 18 and have a width of one thousandth (.001") of an inch. Preferably, the remote side of the diaphragm opening is defined by beveled surfaces 22 in which lie some of the bounding divergent lines of refraction. In substitution for the diaphragm 20, the side might also be supplied with an opaque coating 23, with the exception of a middle area corresponding in location and in dimensions to the size of the linear focus of the lens 18, as shown in Figure 7.

The diagrammatic view shown in Figure 2 includes a lamp 24 appropriately mounted near one end of a tube 25, within the near end of which are mounted a pair of condensers 26. The other end of the tube has interiorly mounted objectives 27 to function as a composite projecting lens 28. Between the condensers 26 and the objectives 27 and, as shown in Figure 3, somewhat nearer to the condensers 26 is our new lenticular disc 9. Further observation of Figure 2 discloses that the reproducing process involves refraction to focus on the sound track of a moving motion picture film 29 backed by an element 30 having a minute mechanical slit 31 through which the light rays are emitted for reception and conversion by a photoelectric cell 32, which is connected in series with a detector 33, amplifier 34 and loud speaker 35. As is well known, when voltage is applied to a photoelectric cell and light is caused to fall upon it, a current passes by means of electron emission from a cathode to an anode, but because the current is so small it is required to be amplified. While the tube 25 has for simplicity been shown integral in Figs. 2 and 3, for actual production the condensers 26 are mounted in one tube 36 which is threaded on one end, the lenticular disc 9 with or without a diaphragm 20 is mounted in another tube 37 which is threaded on both ends and the composite projecting (reducing) lens unit is mounted in a third tube 38 threaded on one end as shown in Fig. 8. The three tubes are then placed in threaded connection and the triple assembly thereof becomes mounted in a tube 39 of larger diameter in which they are secured by crimping both ends of the latter as at 40, thus making an oil-tight unit.

We interpolate mention of our realization that our invention herein shown, described and claimed is readily capable of adaptation to the rather recently developed art of television.

At present our invention as in successful commercial use in New York city and elsewhere obtains one thousandth (.001") of an inch light line with sixteen thousandths (.016") of an inch chordal dimension of the cylindrical lens. Thus we have achieved so concentrated a light beam as to be capable of more reduction than hitherto possible without estimable diminution of intensity and hence realized projection of more sound track components. We obtained an eight thousand (8,000) cycle reproduction with an impartially acknowledged 150% improvement in verity and clarity of tonal reproduction and an insignificantly low cost of installation in comparison with the expensive reproducing apparatus heretofore on the market.

We claim:

1. In an optical appliance the combination of a tube, a plurality of optical units secured in spaced relation within said tube, and a structure comprising an elongated plano-convex lensic formation having a focal length of a few mil and predeterminedly located within said tube, said structure being adapted linearly to refract and being fashioned on its plano side with an opaque border which defines a slit narrower than the width of said lensic formation, said slit adapted to delimit passage of the rays refracted by the latter.

2. The combination of a tube, a plurality of shorter tubes detachably connected end to end and telescopically fitted in said first mentioned tube, an optical trail mounted therein and comprising a projecting objective and a condensing objective and a diaphragm therebetween, said diaphragm provided with a narrow slit extending crosswise of said tube, the ends of said outer tube being crimped around margins of two optical elements of said trail respectively whereby to close said tube.

3. The combination of a tube, an optical trail mounted therein and comprising a diaphragm partitioning said tube and provided with a narrow slit extending diametrically across said tube, two optical units of said trail being located at and closing opposite ends of said tube and means for sealing said ends against entry of dust or oil.

4. Optical apparatus for use in the production of and reproduction from photographic sound tracks, comprising the combination of a tube, an optical trail mounted therein and comprising a diaphragm partitioning said tube and provided with a narrow slit extending diametrically across said tube, a lensic element having focal length of less than 10 mil and partitioning said tube adjacent to said diaphragm, two other optical units of said trail being located at and closing opposite ends of said tube, a source of light in operative proximity to one end of said tube and means for sealing said ends against entry of dust or oil.

5. The combination of a tube, an optical trail mounted therein and comprising a pair of optical units at and closing opposite ends of said tube, and a structure comprising a lens having a focal length of about 5 mil and of masking means confining the optical trail at said lens for preventing aberration of the latter.

6. The combination of a tube, an optical trail mounted therein and comprising: a light projecting unit at one end of said tube, a light condensing unit at the other end of said tube, and inbetween said units a lens having a focal length of about 5 mil and an apertured masking diaphragm constricting the optical trail at said lens whereby to achieve a concentrated light beam capable of further reduction by said projecting unit without estimable diminution of intensity and hence to realize projection of more sound track components.

VICTOR C. ERNST.
ANDREW WOLLENSAK.